United States Patent

[11] 3,627,285

| [72] | Inventor | Ernst A. Siemssen<br>Gwynedd, Pa. |
|------|----------|-----------------------------------|
| [21] | Appl. No. | 834,696 |
| [22] | Filed | June 19, 1969 |
| [45] | Patented | Dec. 14, 1971 |
| [73] | Assignee | Selas Corporation of America |

[54] TOWER FURNACE
6 Claims, 3 Drawing Figs.

[52] U.S. Cl. .................................................. 263/21, 252/378
[51] Int. Cl. .................................................. F27b 3/00
[50] Field of Search .................................... 263/21 B, 27; 252/378

[56] References Cited
UNITED STATES PATENTS

| 759,791 | 5/1904 | Wills | 263/27 |
| 2,543,987 | 3/1951 | Ramsay | 252/378 |
| 3,418,403 | 12/1968 | Garnero | 252/378 X |

*Primary Examiner*—John J. Camby
*Attorney*—E. Wellford Mason

ABSTRACT: A tower furnace having opposed rows of burners in its sidewalls which are regulated to control the bloating and the falling pattern of a sheet of bloatable particles and a method of controlling the furnace to obtain a slab of cellular ceramic material.

PATENTED DEC 14 1971

3,627,285

INVENTOR.
Ernst A. Siemssen
BY
E. W. Dyson

TOWER FURNACE

BACKGROUND AND SUMMARY

The present invention relates to tower furnaces and, more particularly, to a tower furnace designed particularly for the manufacture of ceramic foam from clay or like material, and a method of controlling the falling of particles through such a furnace.

In the manufacture of ceramic foam, individual particles of clay, usually with a bloating agent, are dropped vertically in free fall through a tower furnace chamber. As the particles fall they are heated individually to their fusion temperature and bloated to form hollow spheres. These spheres are collected as a cellular slab, annealed and cut to size. The product produced is a rigid, cellular ceramic material known as ceramic foam that has use as an insulating material or structural element.

As the particles are being heated, their surfaces will become tacky and if they touch they will stick together, or they can stick to the furnace walls and build up. For this reason it is necessary to maintain a reasonably quiescent atmosphere in the furnace chamber. It is necessary, however, that each particle be bloated to substantially the same size to produce a slab of uniform cell size. Although the supply of particles is screened so that they are substantially the same size, some are slightly smaller than others, and the small ones must be kept under heat longer than the larger ones. Therefore, a method and means must be provided to direct the fall of the smaller particles so that they will be subject to heat for a longer time than the larger ones, thereby insuring that all particles will be bloated to substantially the same size. This produces a slab of predominately uniform cell size throughout the thickness of the slab.

It is an object of the invention to provide a tower furnace in which ceramic foam of unusually uniform cell structure can be manufactured. It is a further object of the invention to provide a method of operating a tower furnace to control the falling of particles therein to produce a uniform slab of ceramic foam.

In practicing the invention, there is provided a rectangular furnace that has a plurality of rows of burners in the opposite walls. These burners are so regulated that the trajectory of the falling particles is controlled so that they will be evenly bloated and will be collected into a uniform slab.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

IN THE DRAWINGS

FIG. 1 is a section through a tower furnace of the invention.
FIG. 2 is a section taken on line 2—2 of FIG. 1, and
FIG. 3 is a view taken on line 3—3 of FIG. 1.

DETAILED DESCRIPTION

Figure 1:
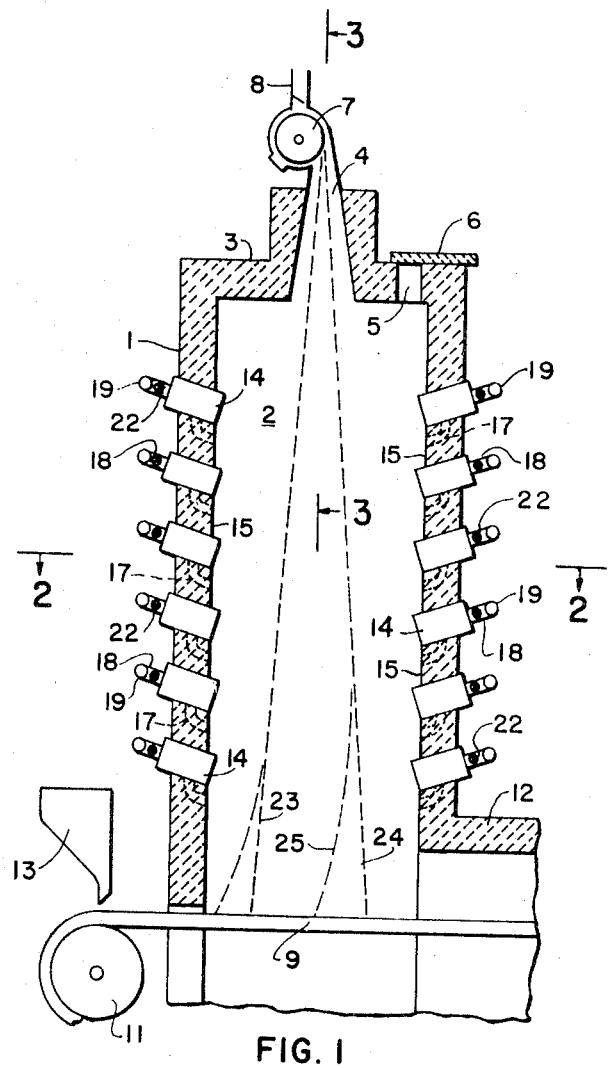

Referring to the drawings there is shown a tower furnace 1 which is constructed in accordance with ordinary furnace practice. This furnace has a vertically extending and unobstructed chamber 2. The top of the furnace is covered by a roof 3 which is provided in the center portion thereof with an elongated inlet 4 and a vent opening 5 which is covered by a movable block 6 to vary the size of this opening. Above the inlet 4 is a feed mechanism for particles to be bloated which includes a feed roller 7 that delivers particles in a thin sheet from a supply 8 to the furnace.

As the particles are dropped through the furnace, they are heated to their fusion temperature and bloated; and are collected on a movable belt 9 which is guided around suitable guide rollers 11 to remove the collected particles to the right, through an annealing section 12 of the apparatus. As is usual in apparatus of this type, a parting agent is placed on the belt 9 upon which the bloated particles are collected. To this end there is provided a hopper 13 which distributes the parting agent in a thin layer on the surface of the belt as it is moved under the furnace.

Figure 3:
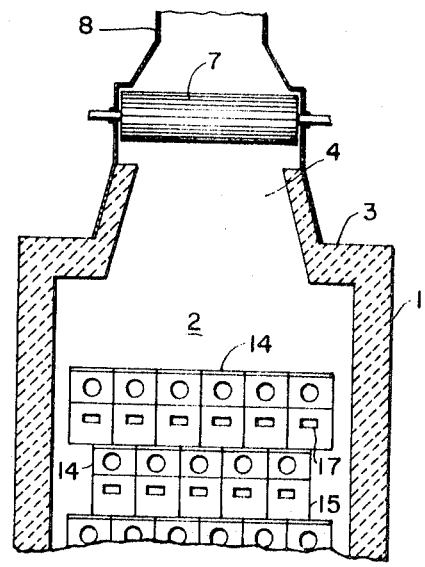
Figure 2:
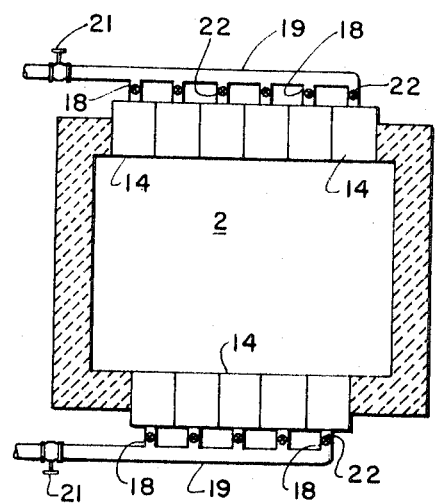

The furnace is heated by a plurality of horizontal rows of burners 14 that are placed in oppositely disposed sidewalls of the furnace. These burners are of the type disclosed in U.S. Pat. No. 3,361,419, and are so placed that they form the furnace wall, as best shown in FIG. 3. The vertically displaced rows of burners are separated by blocks 15 that have in them passages 17, as disclosed in the above-mentioned patent, through which products of combustion are withdrawn from the furnace chamber in order to preheat the fuel supply. It is noted that the burners are displaced relative to each other in the various horizontal rows and on opposite sides of the furnace so that they will provide an even sheet of flame and hot products of combustion along the surface of the furnace walls. The burners of each horizontal row are supplied with fuel and air by a horizontal manifold 19 for each row. Each manifold is controlled individually by a valve 21 so that the rows of burners may be adjusted individually. It is noted that there is provided a valve 22 between the manifold and each burner.

In the operation of the furnace, the burners are lit and the furnace is allowed to heat up. Valves 22 are adjusted to compensate for the individual characteristics of each burner so that all burners in each row are firing at the same rate. This adjustment is not usually changed. Valves 21 are then adjusted so that each row of burners is firing at substantially the same rate. Since the burners are of the type that produce a diffused flame, the result is that the walls direct a curtain of flame and combustion gases toward the interior of the furnace. Products of combustion exhaust through passages 17 and burners 14, as described in U.S. Pat. No. 3,361,419, to preheat the fuel supply. They also exhaust through annealing cover 12 and vent 5. The result is that there is created in chamber 2 a substantially nonturbulent atmosphere hot enough to fuse the particles falling through the chamber and quiescent enough so that the atmosphere will have practically no disturbing effect upon the pattern of the falling sheet of particles.

When the furnace has reached temperature, feed drum 7 is started rotating in a clockwise direction in FIG. 1. The particles to be bloated, which are substantially identical in size, about one one-sixteenth inch long and one thirty-second inch in diameter, are dropped in a thin dispersed sheet vertically downward through chamber 2. The falling sheet of particles will spread somewhat, as shown by lines 23 and 24, so that each particle is subjected to the heat from all sides. The gases from the burners serve to control the amount of spread of the falling particles and prevent them from striking the furnace walls.

As the particles fall through chamber 2 they are heated to their fusion temperature and are bloated to form individual hollow spheres. This temperature will vary somewhat depending upon the clay used for the particles, but will be in the neighborhood of 1,900° F. The individual spheres are collected on a layer of parting material, usually sand or ground scrap foam, on belt 9 and moved to the right in FIG. 1 into the annealing section 12 of the apparatus. The spheres are still tacky on their surface when they land on the belt. Therefore, even though they are somewhat deformed, they will stick together to form a cellular slab of ceramic material. The thickness of the slab built up on belt 9 will depend jointly on the volume of material supplied by feed roll 7 and the speed of the belt.

It is desirable that the slab of ceramic foam built up on belt 9 have a uniform cellular structure from top to bottom. The size of each sphere or cell is determined by the time each particle is at bloating temperature. This means that smaller particles must have a longer time at temperature to bloat to the same size as the larger ones, even by a fraction of a second. The time under heat includes both the time required for the particle to fall to belt 9 and the time required for it to be moved by the belt from the point it lands to beyond the right edge of the furnace chamber. Therefore, it is desirable, if possible, to control this time.

With the arrangement disclosed herein the trajectory of the falling particles can be controlled sufficiently so that an acceptable and substantially uniform product is produced. When the furnace is in operation the fuel pressure can be increased to fire the burners harder in the lower rows of burners on the right side of the furnace in FIG. 1. This will increase the pressure in the lower right portion of the furnace so that the smaller and lighter particles will be deflected to the left relative to the larger and heavier particles. Thus, the lighter particles will fall as shown by line 25. Therefore, by being further to the left on belt 9, they will be subject to furnace heat a little longer. It is realized that it is impossible to insure exactly the same time under heat for all particles, even those of the same size. By manipulating the pressure of the fuel supplied to the various rows of burners, however, a considerable degree of control can be obtained. Thus controlling individually the fuel supply to the various horizontal rows of burners can be used to vary the trajectory of the falling particles and the time they remain under heat. These adjustments do not seem to create enough turbulence in the chamber atmosphere to cause scattering or any substantial amount of colliding between the particles as they fall.

If additional heat is needed in the furnace because of the type of clay being bloated or the quantity of particles dropped, it will be obvious that additional rows of burners can be placed in the other two opposing sides of the furnace, and they can be adjusted in a similar manner to the adjustments just described.

Thus it will be seen that I have provided a tower furnace for the manufacture of ceramic foam and a method of controlling such furnace to obtain foam with a substantially uniform cellular structure. While clay has been mentioned as being the material used, it will be apparent that other materials which will bloat when heated may be used.

While in accordance with the provisions of the Statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. A tower furnace comprising in combination structure forming a vertically extending chamber rectangular in section, a plurality of vertically displaced and opposing rows of burners forming a portion of opposite walls of said chamber, means to supply fuel to said burners, means to control individually the pressure of the supply of fuel to each row of burners in opposing walls of the furnace to provide greater pressure for the burners in one wall than in the other, means forming a roof for said furnace chamber having an elongated opening therein substantially parallel to and midway between said opposing walls having said burners therein, means to form and supply through said opening a loosely formed sheet of particles to be bloated, and means at the bottom of said chamber to collect the bloated particles.

2. The combination of claim 1 in which the burners of each horizontal row are offset with respect to the burners in the adjacent horizontal row.

3. The method of controlling the operation of a tower furnace having a vertically extending, unobstructed furnace chamber with oppositely disposed sidewalls and with vertically displaced opposed rows of burners having adjustable fuel supplies in each of the sidewalls which comprises forming and dropping by gravity a sheet of substantially uniformly sized particles of a bloatable material vertically downward to the bottom of said chamber between the oppositely disposed rows of burners from a location substantially midway between said sidewalls, firing said rows of burners to create on opposite sides of said falling sheet of particles a substantially nonturbulent curtain of flame and combustion gases, heating said sheet of particles to bloating temperature as they fall, controlling the direction of falling of said particles and the location where they contact the bottom of said chamber by increasing the fuel supply to the rows of burners in one sidewall relative to the fuel supply to the rows of burners in the other sidewall by individual adjustment of the fuel supply to said rows of burners, collecting said particles at the bottom of said chamber and moving said particles from the bottom of said chamber under one of said sidewalls.

4. The method of claim 3 in which said particles are collected as a slab, and said slab is moved away from said chamber in a direction under the rows of burners in one of said sidewalls.

5. The method of claim 3 in which some of the rows of burners in one wall are fired harder than the oppositely disposed rows of burners in the other sidewall thereby to move the lighter particles in said stream toward said other sidewall.

6. The method of controlling the operation of a tower furnace having a vertically extending, unobstructed furnace chamber with oppositely disposed sidewalls and with vertically displaced opposed rows of burners having adjustable fuel supplies in each of said sidewalls which comprises forming and dropping by gravity a sheet of substantially uniformly sized particles of a bloatable material vertically downward in said chamber from a location substantially midway between the oppositely disposed rows of burners in said sidewalls, firing said rows of burners in said sidewalls to create on opposite sides of said falling sheet of particles a substantially nonturbulent curtain of flame and combustion gases, heating said sheet of particles to bloating temperature as they fall, moving said particles when they reach the bottom of said chamber from under one of said walls, and controlling the time said particles remain in said chamber by adjusting the pressure of the fuel supply individually to the rows of burners in one of the sidewalls to change the pressure in said chamber thereby to vary the trajectory of the particles so that the lighter particles fall nearer the wall having burners with the lowest pressure.

* * * * *